United States Patent
Mohseni

(10) Patent No.: US 12,473,977 B2
(45) Date of Patent: Nov. 18, 2025

(54) METHODS FOR SURFACE MODIFICATION OF MID-TURBINE FRAME PISTON SEAL RINGS AND INTERFACING COMPONENTS TO ACHIEVE LOW FRICTION AND HIGH WEAR RESISTANCE

(71) Applicant: RTX Corporation, Farmington, CT (US)

(72) Inventor: Hamidreza Mohseni, Avon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/962,668

(22) Filed: Oct. 10, 2022

(65) Prior Publication Data

US 2024/0117880 A1    Apr. 11, 2024

(51) Int. Cl.
*F16J 9/26* (2006.01)
*F01D 11/00* (2006.01)

(52) U.S. Cl.
CPC ............. *F16J 9/26* (2013.01); *F01D 11/005* (2013.01); *F05D 2220/32* (2013.01)

(58) Field of Classification Search
CPC ....... F01D 11/005; F05D 2220/32; F16J 9/00; F16J 9/12; F16J 9/26
See application file for complete search history.

(56) References Cited

U.S. PATENT DOCUMENTS

| | | | |
|---|---|---|---|
| 3,953,343 A * | 4/1976 | Sliney | F16C 33/04 508/104 |
| 4,136,211 A * | 1/1979 | Sliney | F16C 33/121 427/292 |
| 4,738,602 A | 4/1988 | Yamamoto et al. | |
| 11,255,432 B2 | 2/2022 | Stoyanov et al. | |
| 2020/0318737 A1* | 10/2020 | Stoyanov | F01D 25/246 |
| 2021/0270369 A1* | 9/2021 | Harrington | C23C 30/00 |
| 2022/0003125 A1 | 1/2022 | Stoyanov et al. | |

FOREIGN PATENT DOCUMENTS

| | | | |
|---|---|---|---|
| CA | 1283056 C | 4/1991 | |
| CN | 101526136 A | 9/2009 | |
| CN | 202832829 U | 3/2013 | |
| EP | 2503103 A2 | 9/2012 | |
| WO | WO-2009129380 A2 * | 10/2009 | C10M 103/06 |

OTHER PUBLICATIONS

European Search Report for European Application No. 23202737.5; dated Feb. 27, 2024; 6 pages.
European Search Report for European Application No. 23202737.5; dated Sep. 3, 2025; 4 pages.

* cited by examiner

*Primary Examiner* — Gilbert Y Lee
(74) *Attorney, Agent, or Firm* — CANTOR COLBURN LLP

(57) ABSTRACT

The present disclosure provides assemblies, systems and methods for surface modification of piston seal rings and interfacing components. More particularly, the present disclosure provides assemblies, systems and methods for surface modification of mid-turbine frame (MTF) piston seal rings and interfacing components in gas turbine engines to achieve low and/or reduced friction, and/or high and/or improved wear resistance.

17 Claims, 8 Drawing Sheets

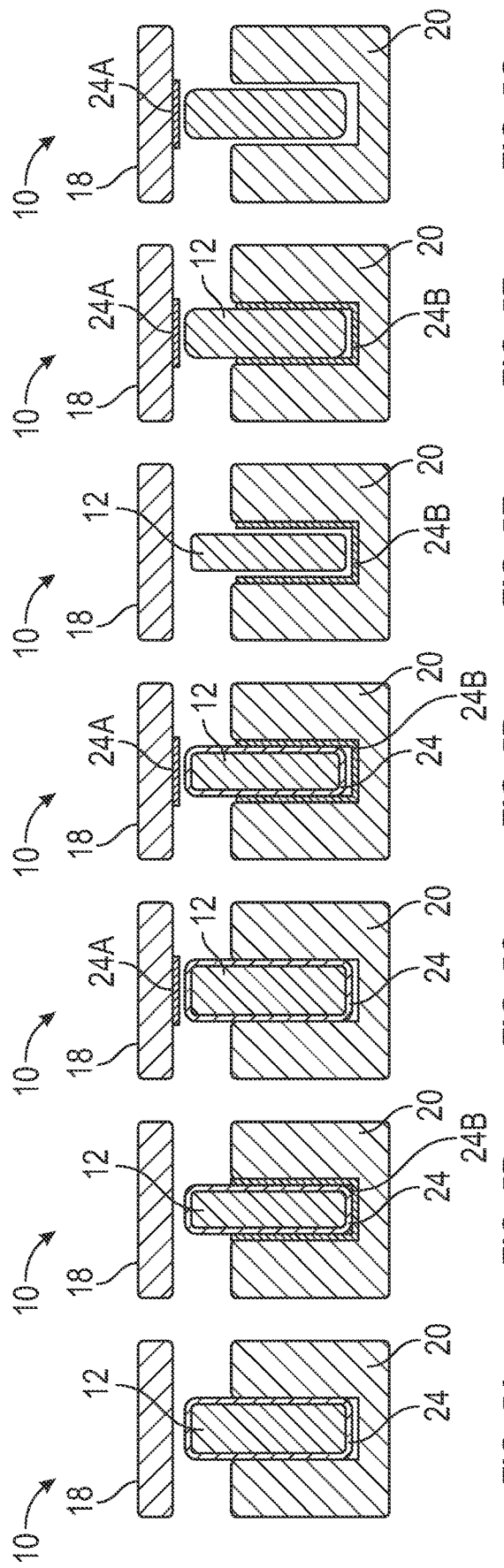

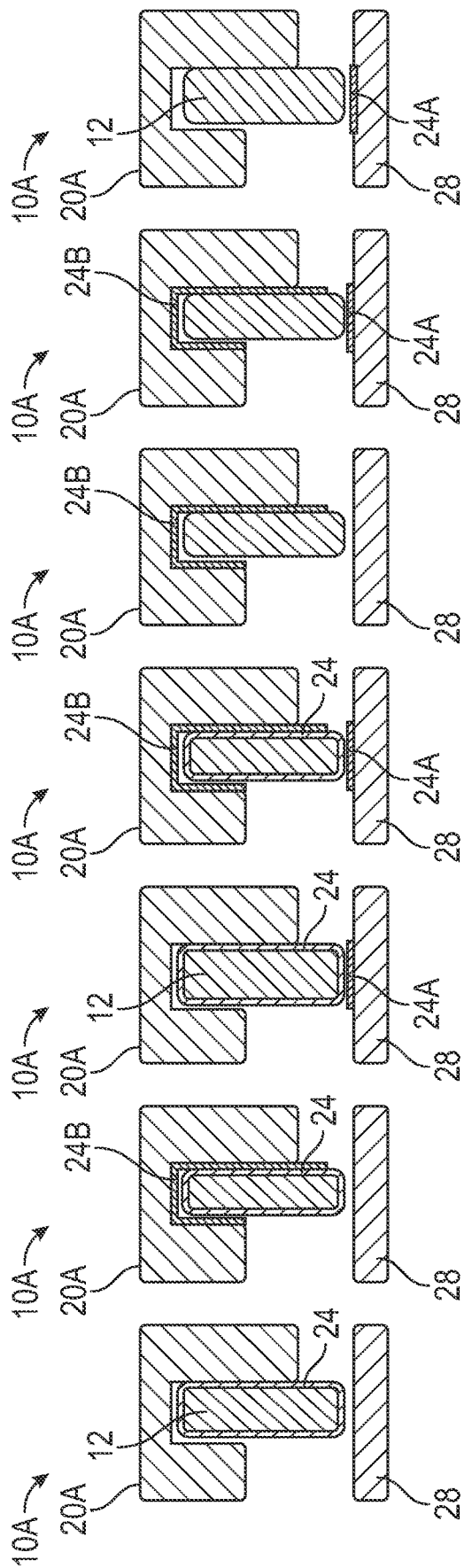

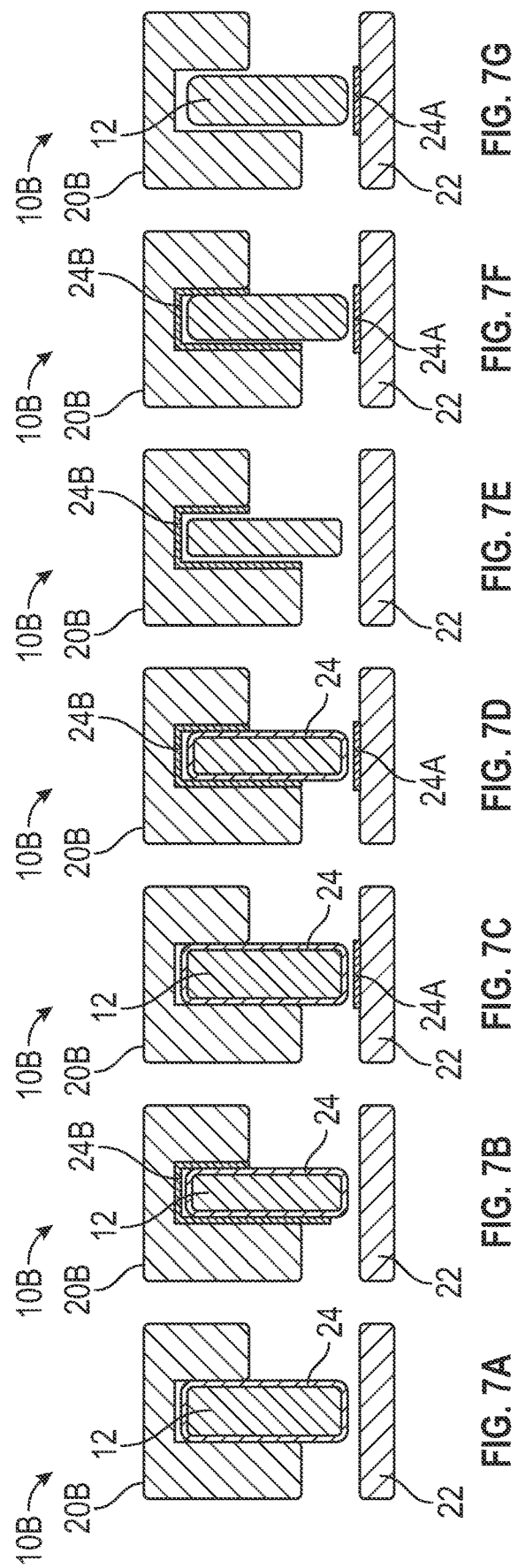

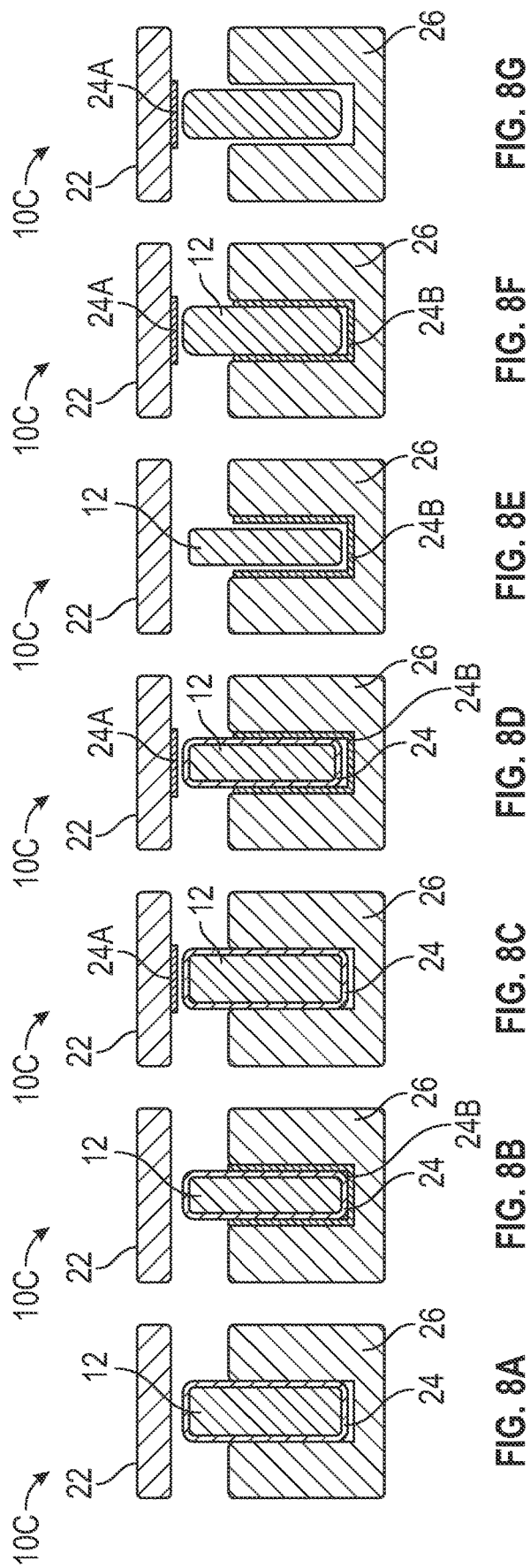

METHODS FOR SURFACE MODIFICATION OF MID-TURBINE FRAME PISTON SEAL RINGS AND INTERFACING COMPONENTS TO ACHIEVE LOW FRICTION AND HIGH WEAR RESISTANCE

TECHNICAL FIELD

The present disclosure relates to assemblies, systems and methods for surface modification of piston seal rings and interfacing components and, more particularly, to assemblies, systems and methods for surface modification of mid-turbine frame (MTF) piston seal rings and interfacing components in gas turbine engines to achieve low/reduced friction and/or high/improved wear resistance.

BACKGROUND

In general, piston seal rings are used at several locations of a typical mid-turbine frame in a gas turbine engine, and this can include inner diameter (ID) and outer diameter (OD) for both after (AFT) and forward (FWD) locations.

It is noted that high operation temperatures (e.g., up to 1600° F.) along with high vibratory motion can make these static piston seal rings prone to progressive wear and significant degradation. Some coatings are known for such piston seal rings (see, e.g., U.S. Pat. No. 11,255,432, the entire contents of which is hereby incorporated by reference in its entirety).

BRIEF DESCRIPTION

The present disclosure provides assemblies, systems and methods for surface modification of piston seal rings and interfacing components. More particularly, the present disclosure provides assemblies, systems and methods for surface modification of mid-turbine frame (MTF) piston seal rings and interfacing components in gas turbine engines to achieve low/reduced friction and/or high/improved wear resistance.

The present disclosure provides for a piston seal ring assembly including a piston seal ring configured to be in contact with a mid-turbine frame vane component and an interfacing component; and wherein at least one of the piston seal ring, the mid-turbine frame vane component or the interfacing component includes a glaze layer of oxide particles fabricated from a surface treatment or surface modification.

In addition to one or more of the features described, or as an alternative to any of the foregoing embodiments, the piston seal ring is a mid-turbine frame piston seal ring in a gas turbine engine; and wherein the piston seal ring is selected from the group consisting of an after outer diameter piston seal ring, an after inner diameter piston seal ring, a forward outer diameter piston seal ring and a forward inner diameter piston seal ring; and wherein the interfacing component is at least one of an outer air seal component, a heatshield, a rear air seal or an inner case.

In addition to one or more of the features described, or as an alternative to any of the foregoing embodiments, wherein at least a portion of the piston seal ring comprises a cobalt-based wear-resistant coating.

In addition to one or more of the features described, or as an alternative to any of the foregoing embodiments, the piston seal ring comprises a nickel-based superalloy, and wherein the mid-turbine frame vane component comprises a nickel-based superalloy, and wherein the interfacing component comprises a precipitation-hardening nickel-chromium base cast alloy or a nickel-based superalloy.

In addition to one or more of the features described, or as an alternative to any of the foregoing embodiments, the surface treatment or surface modification includes at least one of laser glazing, laser-induced oxidation, laser-assisted oxide deposition, pulse laser deposition, or flame-induced oxidation surface treatments or modifications.

In addition to one or more of the features described, or as an alternative to any of the foregoing embodiments, wherein only the piston seal ring includes the glaze layer of oxide particles fabricated from the surface treatment or surface modification; or wherein only the mid-turbine frame component includes the glaze layer of oxide particles fabricated from the surface treatment or surface modification; or wherein only the interfacing component includes the glaze layer of oxide particles fabricated from the surface treatment or surface modification.

In addition to one or more of the features described, or as an alternative to any of the foregoing embodiments, the piston seal ring includes a first glaze layer of oxide particles fabricated from the surface treatment or surface modification, and the mid-turbine frame component includes a second glaze layer of oxide particles fabricated from the surface treatment or surface modification.

In addition to one or more of the features described, or as an alternative to any of the foregoing embodiments, the piston seal ring includes a first glaze layer of oxide particles fabricated from the surface treatment or surface modification, and the interfacing component includes a second glaze layer of oxide particles fabricated from the surface treatment or surface modification.

In addition to one or more of the features described, or as an alternative to any of the foregoing embodiments, the mid-turbine frame component includes a first glaze layer of oxide particles fabricated from the surface treatment or surface modification, and the interfacing component includes a second glaze layer of oxide particles fabricated from the surface treatment or surface modification.

In addition to one or more of the features described, or as an alternative to any of the foregoing embodiments, the piston seal ring includes a first glaze layer of oxide particles fabricated from the surface treatment or surface modification, and the mid-turbine frame component includes a second glaze layer of oxide particles fabricated from the surface treatment or surface modification, and the interfacing component includes a third glaze layer of oxide particles fabricated from the surface treatment or surface modification.

The present disclosure provides for a surface modification method including fabricating, via a surface treatment or a surface modification, at least one of a piston seal ring, a mid-turbine frame vane component or an interfacing component to include a glaze layer of oxide particles; and positioning the piston seal ring to be in contact with the mid-turbine frame vane component and the interfacing component.

The above described and other features are exemplified by the following figures and detailed description.

Any combination or permutation of embodiments is envisioned. Additional features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are example embodiments wherein the like elements are numbered alike.

Features and aspects of embodiments are described below with reference to the accompanying drawings, in which elements are not necessarily depicted to scale.

Figure 1:
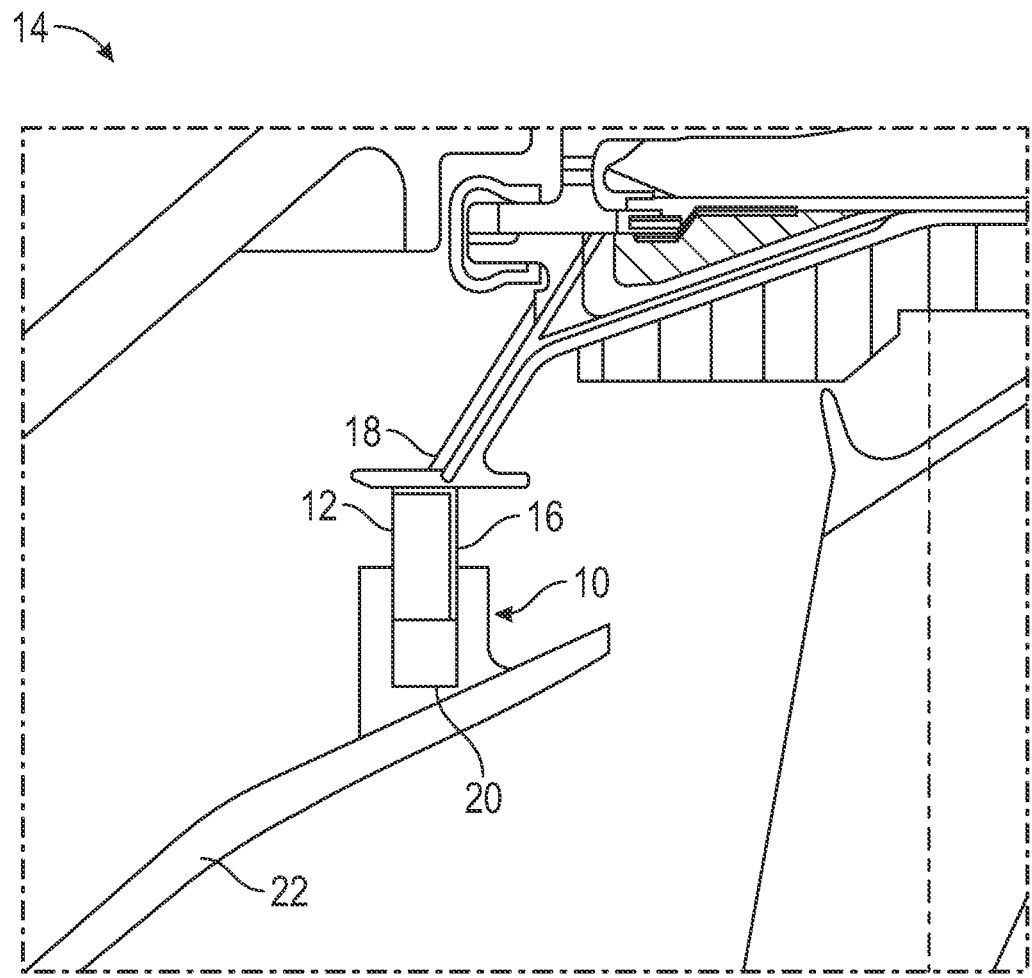
Figure 2:
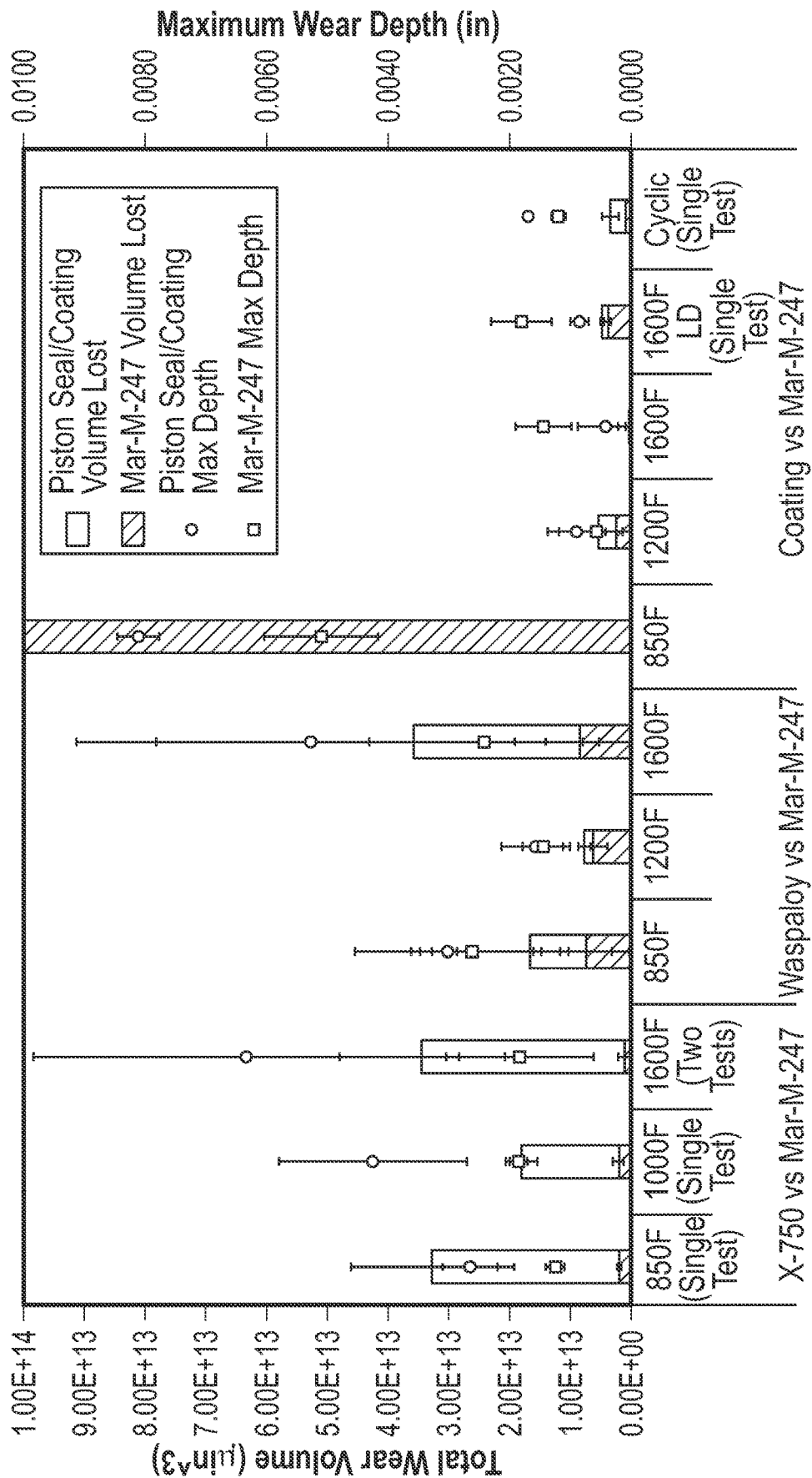
Figure 3:
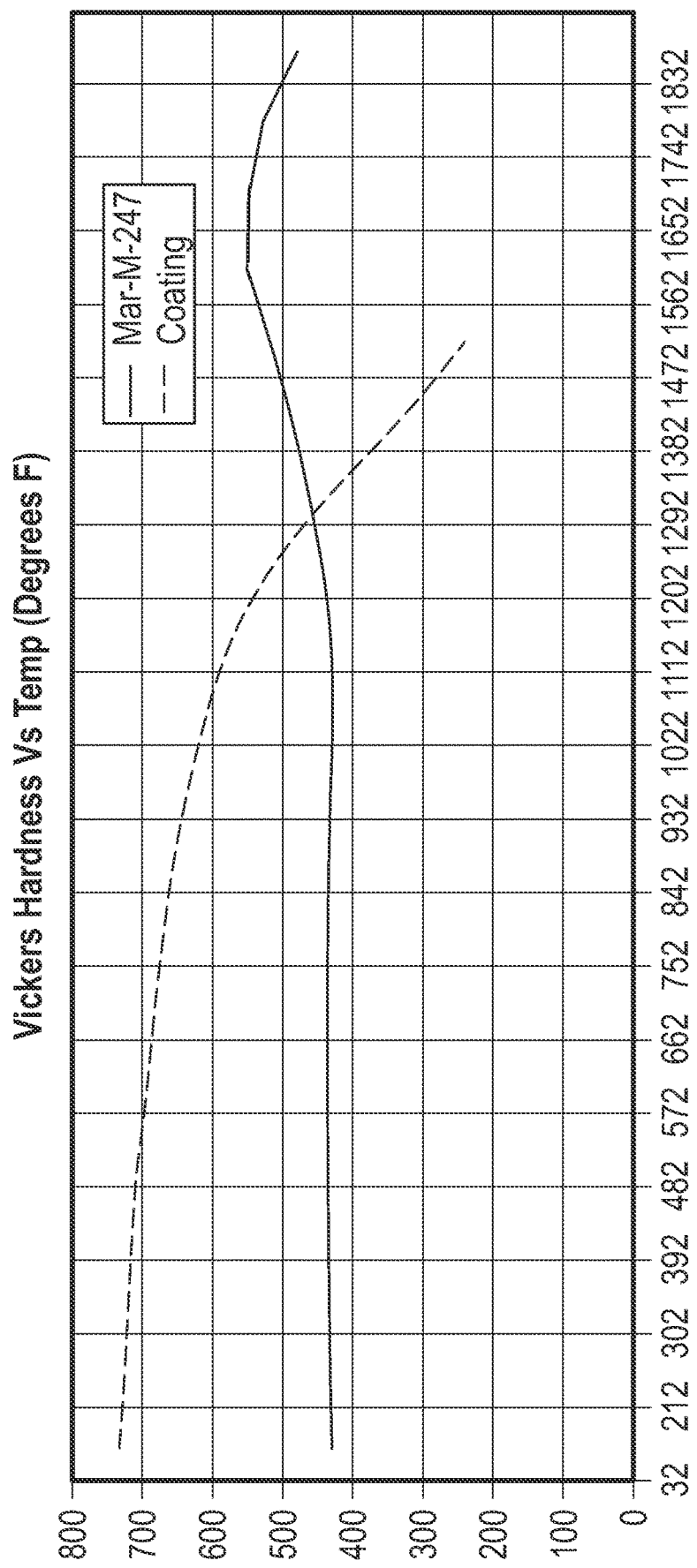
Figure 4:
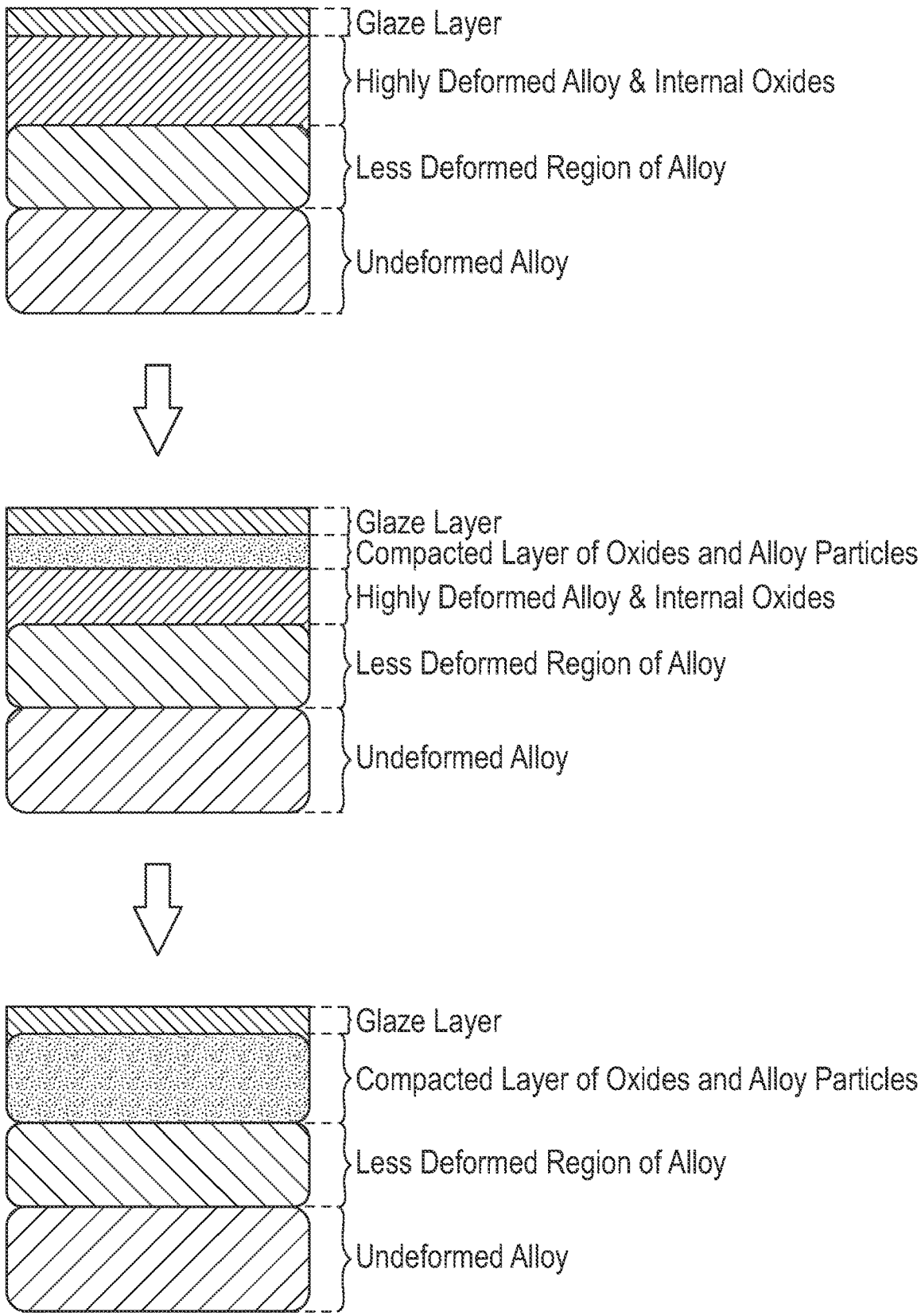

Example embodiments of the present disclosure are further described with reference to the appended figures. It is to be noted that the various steps, features and combinations of steps/features described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 1 is a cross-section of a piston seal ring assembly, and shows the interface between an AFT OD piston seal ring coated with a wear resistant coating (e.g., a cobalt-based wear-resistant coating) and the mid-turbine frame vane and the outer air seal counter-faces;

FIG. 2 is a bar chart showing results of category VI small scale tribology testing, uniaxial pin-on-plate benchmarked uncoated and coated with a wear resistant coating (wear resistant coating on Waspaloy™—a nickel-based superalloy) (piston seal ring representative) versus an uncoated nickel-based superalloy (Mar-M-247™) (MTF vane groove representative);

FIG. 3 is a graph showing how the hardness of both a wear resistant coating and a Mar-M-247™ alloy (nickel-based superalloy) varies as environmental temperature elevates;

FIG. 4 is a schematic showing the structure and mechanism of formation of glaze layers of oxide particles in a typical tribological contact, when one (both) of the interfacing materials is (are) made of metals, alloys or superalloys;

FIGS. 5A-5G are partial cross-sections of a piston seal ring assembly (AFT OD piston seal ring assembly);

FIGS. 6A-6G are partial cross-sections of a piston seal ring assembly (AFT ID piston seal ring assembly);

FIGS. 7A-7G are partial cross-sections of a piston seal ring assembly (FWD OD piston seal ring assembly); and FIGS. 8A-8G are partial cross-sections of a piston seal ring assembly (FWD ID piston seal ring assembly).

DETAILED DESCRIPTION

The example embodiments disclosed herein are illustrative of assemblies for surface modification of piston seal rings, and systems of the present disclosure and methods/techniques thereof. It should be understood, however, that the disclosed embodiments are merely examples of the present disclosure, which may be embodied in various forms. Therefore, details disclosed herein with reference to example assemblies for surface modification of piston seal rings and associated processes/techniques of fabrication/assembly and use are not to be interpreted as limiting, but merely as the basis for teaching one skilled in the art how to make and use the assemblies/systems and/or alternative assemblies/systems of the present disclosure.

The present disclosure provides assemblies, systems and methods for surface modification of piston seal rings and interfacing components.

More particularly, the present disclosure provides assemblies, systems and methods for surface modification of mid-turbine frame (MTF) piston seal rings and interfacing components in gas turbine engines to achieve low/reduced friction and/or high/improved wear resistance.

As shown in FIG. 1, for the utilization of a piston seal ring 12 for a mid-turbine frame section 14 of a gas turbine engine, a wear-resistant coating 16 (e.g., a cobalt-based coating 16; a cobalt-molybdenum-chromium-silicon (Co—Mo—Cr—Si) based coating material 16) can be applied onto the AFT OD piston seal ring 12 (e.g., ring 12 of Waspaloy™ alloy or the like (e.g., a nickel-based superalloy or the like)), and with the piston seal ring 12 interfaced with the outer air seal 18 (e.g., seal 18 fabricated from Inconel™ 713C Alloy, a precipitation-hardening nickel-chromium base cast alloy or the like) and the mid-turbine frame vane seal groove 20 (e.g., groove 20 fabricated from Mar-M-247™ alloy, a nickel-based superalloy or the like).

FIG. 1 is a cross-section of a piston seal ring assembly 10, and shows the interface between an AFT OD piston seal ring 12 coated with a wear resistant coating 16 (e.g., a cobalt-based wear-resistant coating) and the mid-turbine frame vane 22 (via vane seal groove 20) and the outer air seal 18 counter-faces.

The cobalt-based wear-resistant coating 16 can be a high velocity oxygen fuel (HVOF) cobalt-based coating with unique wear and corrosion resistance. The high wear resistance in such a coating 16 stems from the presence of a hard intermetallic phase called a Laves phase with up to 55 vol. % in a soft cobalt solid-solution matrix.

In some instances, fielded piston seal rings 12 coated with example coating 16 exhibited poor wear performance and extensive adhesive and abrasive wear was observed on the mating MTF vane groove 20 and outer air seal 18. As shown in FIG. 2, poor wear behavior at low temperature was noted in a small-scale uniaxial pin-on-plate fretting/sliding wear tests (e.g., Category VI Tribology tests), that were conducted under similar conditions as gas turbine engine operation conditions at temperature ranges of 850 to 1600° F. and cyclical between low and high temperatures. The wear volume at 850° F. was up to three orders of magnitude higher than the tests conducted at elevated temperatures.

One possible reason for the excessive wear can be the high hardness of the example coating 16 at relatively low temperature (e.g., below 850° F.) with respect to the MTF vane 22 that is fabricated of Mar-M-247™ alloy, which is a nickel-based superalloy. This effect can be even more pronounced when it comes to the engines that operate at cold atmospheres (e.g., flights at 40,000 ft. or above).

FIG. 3 is a graph showing how the hardness of both an example coating 16 and a Mar-M-247™ alloy (nickel-based superalloy) varies as environmental temperature elevates.

The higher operating temperature can be beneficial for wear performance of both an example coating 16 or the like (e.g., a cobalt-based wear-resistant coating or the like) and a Mar-M-247™ alloy or the like (e.g., a nickel-based superalloy or the like). For example, the higher operating temperature can help in minimizing the gap in hardness, and importantly can facilitate the formation of a solid-lubricant low friction glazed layer that includes compacted layers of oxides and/or oxide particles and can accommodate interfacial stresses and lowers friction and wear. One present design was based on the formation of a wear protective glaze layer as a result or byproduct of engine operation, which appeared to be insufficient for engines operating at a cold environment.

It is therefore noted that an exemplary focus of the present disclosure is to introduce a glaze layer of oxide particles (e.g., a pre-glaze condition) by adjusting the microstructure of the tribo-couple of an example coating 16 or the like (e.g., a cobalt-based wear-resistant coating 16 or the like) versus a Mar-M-247™ alloy or the like (e.g., a nickel-based superalloy or the like), by using a variety of surface modification techniques to achieve low/reduced friction and reduced wear in a wider operation envelop of low and high temperatures. It is noted that the same or similar surface treatments may be used for other areas/components of MTF section 14 or the like (e.g., the uncoated areas of piston seal ring 12 and other areas of MTF vane groove 20), or other areas of the gas turbine engine or the like, to take advantage of glaze layers of oxide particles to mitigate friction and wear.

The schematic in FIG. 4 shows the tribological evolution of a glaze layer of oxide particles on the surface of Ni-based superalloys. Operation at low temperatures does not favor the formation of a homogeneous and robust glaze layer of oxide particles in a typical tribological system. The formation of a glaze layer of oxide particles depends on a variety of parameters and can include duration of the contact, ambient temperature, oxidation rate of various constituents in the alloy and relative strength of the alloy.

The present disclosure provides for using surface treatments such as laser surface treatments or the like (e.g., laser glazing, laser-induced oxidation, laser-assisted oxide deposition (pulse laser deposition)), or flame-induced oxidation surface treatments, as methods to achieve low/reduced friction and reduced wear for the components by providing glaze layers of oxide particles on the components that have undergone the surface treatments of the present disclosure.

The proof-of-concept pin-on-plate fretting/sliding wear tests at 850° F. and 1600° F. revealed formation of glaze layers of oxide particles at 1600° F. on uncoated pins of Waspaloy™ alloy or the like (e.g., a nickel-based superalloy or the like) and uncoated plates of Mar-M-247 alloy or the like (e.g., a nickel-based superalloy or the like), and resulted in an order of magnitude difference in average wear depth (0.0024 inch plate/0.0084 inch pin at 1600° F. vs. 0.034 inch plate/0.081 inch pin at 850° F.). In example embodiments, the surface treatments (ST) can be applied to the various components based on the proposed architectures as shown in FIGS. 5A-5G and FIGS. 6A-6G and FIGS. 7A-7G and FIGS. 8A-8G.

FIGS. 5A-5G are partial cross-sections of a piston seal ring assembly 10 (AFT OD piston seal ring assembly 10).

In FIGS. 5A-5G, each piston ring assembly 10 can include a piston seal ring 12 (e.g., ring 12 of Waspaloy™ alloy or the like (e.g., a nickel-based superalloy or the like) for a mid-turbine frame (MTF) section 14 of a gas turbine engine. It is noted that a wear-resistant coating 16 (e.g., a cobalt-based coating 16 that is a cobalt-molybdenum-chromium-silicon (Co—Mo—Cr—Si) based coating material—see FIG. 1) can be applied onto at least a portion of the AFT OD piston seal ring 12. An example surface treatment (ST) 24 can be applied onto at least a portion of the AFT OD piston seal ring 12 coated with coating 16. A reason for the ST 24 to the coating 16 is to have the pre-oxidized (glazed layer oxides 24) on the coating 16 to reduce friction and wear.

Piston seal ring 12 can be interfaced with the outer air seal 18 (e.g., seal 18 fabricated from Inconel™ 713C Alloy, a precipitation-hardening nickel-chromium base cast alloy or the like) and the mid-turbine frame vane seal groove 20 (e.g., groove 20 fabricated from Mar-M-247™ alloy, a nickel-based superalloy or the like).

In example embodiments and as shown in FIGS. 5A-5G, at least a portion of the piston seal ring 12 can include a layer/section 24 that has been surface treated (e.g., laser surface treated or flame-induced oxidation surface treated) to form a glaze layer 24 of oxide particles; and/or at least a portion of the outer air seal 18 can include a layer/section 24A that has been surface treated to form a glaze layer 24A of oxide particles; and/or at least a portion of the MTF vane seal groove 20 can include a layer/section 24B that has been surface treated to form a glaze layer 24B of oxide particles. It is noted that the surface treatments can be localized to cover the entire contact and/or non-contact surfaces of ring 12 and/or seal 18 and/or groove 20.

FIGS. 6A-6G are partial cross-sections of a piston seal ring assembly 10A (AFT ID piston seal ring assembly 10A).

In FIGS. 6A-6G, each piston ring assembly 10A can include a piston seal ring 12 (e.g., ring 12 of Waspaloy™ alloy or the like (e.g., a nickel-based superalloy or the like) for a mid-turbine frame (MTF) section 14 of a gas turbine engine.

Piston seal ring 12 can be interfaced with the heat shield 28 of the outer air seal (e.g., heat shield 28 fabricated from Inconel™ 713C Alloy, a precipitation-hardening nickel-chromium base cast alloy or the like) and the mid-turbine frame (MTF) vane seal groove 20A (e.g., groove 20A fabricated from Mar-M-247™ alloy, a nickel-based superalloy or the like).

In example embodiments and as shown in FIGS. 6A-6G, at least a portion of the piston seal ring 12 can include a layer/section 24 that has been surface treated (e.g., laser surface treated or flame-induced oxidation surface treated) to form a glaze layer 24 of oxide particles; and/or at least a portion of the heat shield 28 can include a layer/section 24A that has been surface treated to form a glaze layer 24A of oxide particles; and/or at least a portion of the MTF vane seal groove 20A can include a layer/section 24B that has been surface treated to form a glaze layer 24B of oxide particles. It is noted that the surface treatments can be localized to cover the entire contact and/or non-contact surfaces of ring 12 and/or shield 28 and/or groove 20A.

FIGS. 7A-7G are partial cross-sections of a piston seal ring assembly 10B (FWD OD piston seal ring assembly 10B).

In FIGS. 7A-7G, each piston ring assembly 10B can include a piston seal ring 12 (e.g., ring 12 of Waspaloy™ alloy or the like (e.g., a nickel-based superalloy or the like) for a mid-turbine frame (MTF) section 14 of a gas turbine engine.

Piston seal ring 12 can be interfaced with the rear air seal groove 20B (e.g., groove 20B fabricated from Waspaloy™ alloy or the like (e.g., a nickel-based superalloy or the like) and the MTF vane 22 (e.g., vane 22 fabricated from Mar-M-247™ alloy, a nickel-based superalloy or the like).

In example embodiments and as shown in FIGS. 7A-7G, at least a portion of the piston seal ring 12 can include a layer/section 24 that has been surface treated (e.g., laser surface treated or flame-induced oxidation surface treated) to form a glaze layer 24 of oxide particles; and/or at least a portion of the groove 20B can include a layer/section 24B that has been surface treated to form a glaze layer 24B of oxide particles; and/or at least a portion of the MTF vane 22 can include a layer/section 24A that has been surface treated to form a glaze layer 24A of oxide particles. It is noted that the surface treatments can be localized to cover the entire contact and/or non-contact surfaces of ring 12 and/or groove 20B and/or vane 22.

FIGS. 8A-8G are partial cross-sections of a piston seal ring assembly 10C (FWD ID piston seal ring assembly 10C).

In FIGS. 8A-8G, each piston ring assembly 10C can include a piston seal ring 12 (e.g., ring 12 of Waspaloy™ alloy or the like (e.g., a nickel-based superalloy or the like) for a mid-turbine frame section 14 of a gas turbine engine.

Piston seal ring 12 can be interfaced with the inner case seal groove 26 (e.g., groove 26 fabricated from Inconel™ 713C Alloy, a precipitation-hardening nickel-chromium base cast alloy or the like) and the mid-turbine frame vane 22 (e.g., vane 22 fabricated from Mar-M-247™ alloy, a nickel-based superalloy or the like).

In example embodiments and as shown in FIGS. 8A-8G, at least a portion of the piston seal ring 12 can include a layer/section 24 that has been surface treated (e.g., laser surface treated or flame-induced oxidation surface treated) to form a glaze layer 24 of oxide particles; and/or at least a portion of the vane 22 can include a layer/section 24A that has been surface treated to form a glaze layer 24A of oxide particles; and/or at least a portion of the groove 26 can include a layer/section 24B that has been surface treated to form a glaze layer 24B of oxide particles. It is noted that the surface treatments can be localized to cover the entire contact and/or non-contact surfaces of ring 12 and/or vane 22 and/or groove 26.

It is noted that the above designs/architectures of FIGS. 5A-5G and FIGS. 6A-6G and FIGS. 7A-7G and FIGS. 8A-8G can be accompanied with optimization of surface roughness and skewness of the glazed layers 24, 24A, 24B to avoid high running-in coefficient of friction (COF) at cold start.

The thickness of each laser modified glaze layer 24, 24A, 24B can be adjusted with wear rate of the glazed layer 24, 24A, 24B at specific operation conditions, and replenishing rate of the glaze layer 24, 24A, 24B through oxidation kinetic (oxide growth) to provide solid lubricant oxides/phases that service a wide range of operation conditions.

The formation of a glaze layer 24, 24A, 24B with solid lubricant oxides, with good adhesion to its substrate, can be achieved using heat-treatment using a strictly controlled isothermal condition. This method may not be practical for large size and/or complex geometry hardware like MTF vane and the turbine intermediate case (TIC) which justifies the application of laser or any other surface treatment method that limits the heat-affected zone to the surface/subsurface and potentially prevents formation of undesirable phases such as intermetallics with negative impact on wear resistance, reliability and longevity of a component.

The laser surface treatment/functionalization can include deposition of compounds (single or multilayer of various composition) on the contacting surfaces that facilitate formation of glaze layers of oxide particles 24, 24A, 24B, while at operation or undergoing in-situ modification and provide solid-lubrication during service.

It is noted that the present disclosure provides for laser modified surfaces 24, 24A, 24B that facilitate the formation of homogenous and adherent glaze layers 24, 24A, 24B that avoid high friction and reduces wear. This can extend the life of both piston seal ring 12 as well as its counter-faces (e.g., MTF vane 22, outer air seal 18 and TIC).

It is noted that the laser modified surfaces 24, 24A, 24B provide shorter run-in periods and contact establishments between the mating surfaces by optimization of the surface parameters such as roughness and skewness. Likewise, a laser surface texturing 24, 24A, 24B for surface optimization can help in controlling the static COF of the components.

Each laser modified layer 24, 24A, 24B can provide frictional heat management that avoids formation of hot junctions between asperities at interfaces and can reduce the risk of severe adhesive wear while at operation.

The wear rate in each laser modified layer 24, 24A, 24B can be adjusted with the replenishment rate of oxides in such a way that the contacting interfaces always have wear protection during various flight cycle and engine operation conditions.

Each laser surface treatment 24, 24A, 24B can provide wear protection to parts with complex geometries (e.g., MTF vane and TIC grooves).

It is also noted that the laser surface treatments 24, 24A, 24B can be a part of a repair strategy for fielded parts to avoid the cost of scraping expensive hardware (e.g., MTF vane).

There are many benefits of the assemblies, systems and methods of the present disclosure, including, without limitation: low friction and wear resistant piston seal rings 12 at several locations of the MTF are capable of operating with higher efficiency at a wide range of temperatures and environments; and/or enhanced sealing provides higher/improved endurance and reliability for engine components, which can significantly reduce engine overhaul cost.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the systems and methods of the present disclosure have been described with reference to example embodiments thereof, the present disclosure is not limited to such example embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and, in a manner, consistent with the scope of the disclosure.

What is claimed is:

1. A piston seal ring assembly comprising:
   a piston seal ring configured to be in contact with a mid-turbine frame vane component and an interfacing component;
   wherein the piston seal ring includes a glaze layer of oxide particles fabricated from a surface treatment or surface modification, wherein the glaze layer is disposed on a cobalt-molybdenum-chromium-silicon based coating material, and
   wherein the mid-turbine frame vane component or the interfacing component includes a second glaze layer of oxide particles fabricated from a surface treatment or surface modification.

2. The piston seal ring assembly of claim 1, wherein the piston seal ring is a mid-turbine frame piston seal ring in a gas turbine engine; and
   wherein the piston seal ring is selected from the group consisting of an after outer diameter piston seal ring, an after inner diameter piston seal ring, a forward outer diameter piston seal ring and a forward inner diameter piston seal ring; and
   wherein the interfacing component is at least one of an outer air seal component, a heatshield, a rear air seal or an inner case.

3. The piston seal ring assembly of claim 1, wherein at least a portion of the piston seal ring comprises a cobalt-based wear-resistant coating.

4. The piston seal ring assembly of claim 1, wherein the piston seal ring comprises a nickel-based superalloy, and wherein the mid-turbine frame vane component comprises a nickel-based superalloy, and wherein the interfacing component comprises a precipitation-hardening nickel-chromium base cast alloy or a nickel-based superalloy.

5. The piston seal ring assembly of claim 1, wherein the surface treatment or surface modification includes at least one of laser glazing, laser-induced oxidation, laser-assisted oxide deposition, pulse laser deposition, or flame-induced oxidation surface treatments or modifications.

6. The piston seal ring assembly of claim 1, wherein the mid-turbine frame component includes the second glaze layer of oxide particles fabricated from the surface treatment or surface modification.

7. The piston seal ring assembly of claim 1, wherein the interfacing component includes the second glaze layer of oxide particles fabricated from the surface treatment or surface modification.

8. A piston seal ring assembly comprising:
   a piston seal ring configured to be in contact with a mid-turbine frame vane component and an interfacing component;
   wherein the mid-turbine frame component includes a first glaze layer of oxide particles fabricated from the surface treatment or surface modification, wherein the first glaze layer is disposed on a cobalt-molybdenum-chromium-silicon based coating material, and the interfacing component includes a second glaze layer of oxide particles fabricated from the surface treatment or surface modification.

9. The piston seal ring assembly of claim 1, wherein the mid-turbine frame component includes the second glaze layer of oxide particles fabricated from the surface treatment or surface modification, and the interfacing component includes a third glaze layer of oxide particles fabricated from the surface treatment or surface modification.

10. A surface modification method comprising:
    fabricating, via a surface treatment or a surface modification a piston seal ring to include a first glaze layer of oxide particles, wherein the first glaze layer is disposed on a cobalt-molybdenum-chromium-silicon based coating material,
    fabricating via a surface treatment or a surface modification a mid-turbine frame vane component or an interfacing component to include a second glaze layer of oxide particles; and
    positioning the piston seal ring to be in contact with the mid-turbine frame vane component and the interfacing component.

11. The method of claim 10 further comprising positioning the piston seal ring in a mid-turbine frame in a gas turbine engine; and
    wherein the piston seal ring is selected from the group consisting of an after outer diameter piston seal ring, an after inner diameter piston seal ring, a forward outer diameter piston seal ring and a forward inner diameter piston seal ring; and
    wherein the interfacing component is at least one of an outer air seal component, a heatshield, a rear air seal or an inner case.

12. The method of claim 10, wherein at least a portion of the piston seal ring comprises a cobalt-based wear-resistant coating.

13. The method of claim 10, wherein the piston seal ring comprises a nickel-based superalloy, and wherein the mid-turbine frame vane component comprises a nickel-based superalloy, and wherein the interfacing component comprises a precipitation-hardening nickel-chromium base cast alloy or a nickel-based superalloy.

14. The method of claim 10, wherein the surface treatment or surface modification includes at least one of laser glazing, laser-induced oxidation, laser-assisted oxide deposition, pulse laser deposition, or flame-induced oxidation surface treatments or modifications.

15. The method of claim 10, wherein the mid-turbine frame component includes the second glaze layer of oxide particles fabricated from the surface treatment or surface modification.

16. The method of claim 10, wherein the interfacing component includes the second glaze layer of oxide particles fabricated from the surface treatment or surface modification.

17. The method of claim 10, wherein the mid-turbine frame component includes the second glaze layer of oxide particles fabricated from the surface treatment or surface modification, and the interfacing component includes a third glaze layer of oxide particles fabricated from the surface treatment or surface modification.

* * * * *